No. 788,824. PATENTED MAY 2, 1905.
G. B. DRYDEN.
RESILIENT VEHICLE TIRE.
APPLICATION FILED JULY 8, 1904.
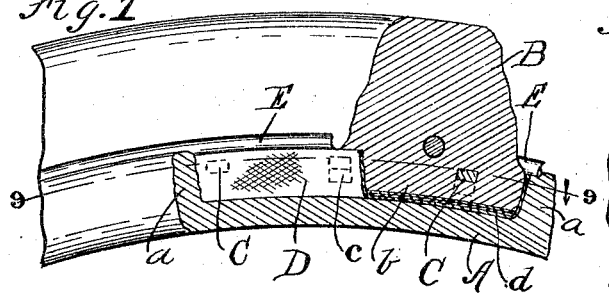
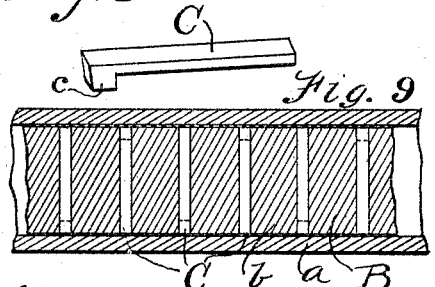
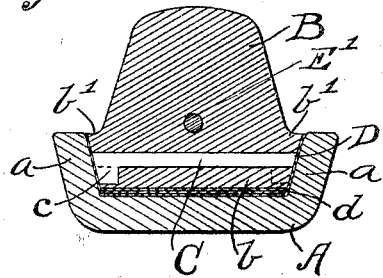
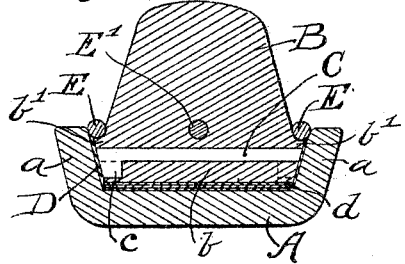
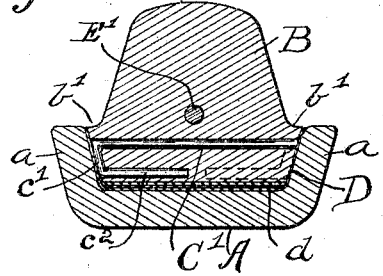
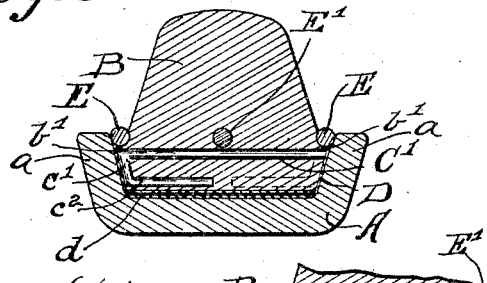
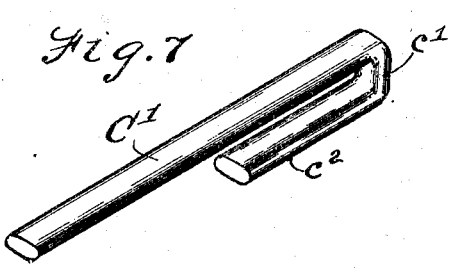
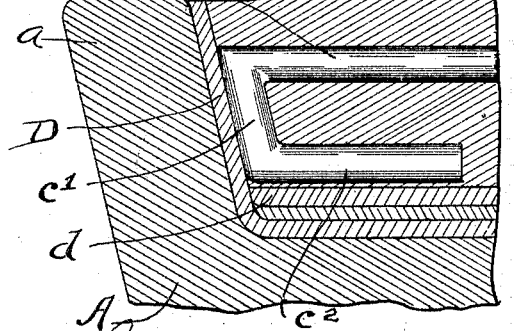
Witnesses
J. W. Angell
W. W. Wittenburg
Inventor.
George B. Dryden.
by Charles W. Reed, Atty.

No. 788,824.

Patented May 2, 1905.

UNITED STATES PATENT OFFICE.

GEORGE B. DRYDEN, OF CHICAGO, ILLINOIS.

RESILIENT VEHICLE-TIRE.

SPECIFICATION forming part of Letters Patent No. 788,824, dated May 2, 1905.

Application filed July 8, 1904. Serial No. 215,717.

*To all whom it may concern:*

Be it known that I, GEORGE B. DRYDEN, a citizen of the United States, and a resident of the city of Chicago, county of Cook, and State of Illinois, have invented certain new and useful Improvements in Resilient Vehicle-Tires; and I do hereby declare that the following is a full, clear, and exact description of the same, reference being had to the accompanying drawings, and to the letters of reference marked thereon, which form a part of this specification.

This invention relates to a resilient vehicle-tire, and more particularly to rubber tires and means for retaining the same in permanent relation with the wheel-rim whereon the same are secured.

Heretofore in the construction of tires for vehicle-wheels wherein a binding wire or wires extending peripherally of the rim are used in connection with transverse bars or wires difficulty has been found in retaining the resilient tire in position owing to the excessive lateral stress due to the condition of the road-bed and to the lateral pressure on the tire when turning corners. In such constructions it frequently occurs that the cross wires or bars are bent downwardly at the ends or bowed upwardly at the middle sufficiently to permit the ends of the cross-wires to slip past the side binding-wires, if such are used. This of course permits the tire-strip to fall from the wheel. It also frequently occurs where such constructions have been used that though the transverse wires or bars may remain said lateral stress acts to tear the rubber transversely along said bars or cross-wires permitting the tire-strip to roll from the channel.

The object of this invention is to obviate these objections by providing a cross bar or wire adapted, while retaining great resiliency, to afford a double bond in the tire-strip, thereby obviating the tendency of the strip to tear away from said cross-wires.

It is also an object of the invention to provide a construction in which the cross wires or bars afford a positive though resilient bearing in the bottom of the channel in which the strip is secured, thus maintaining a positive though somewhat resilient and yielding support for the peripheral binding wire or wires.

It is a further object of the invention to provide a construction whereby the cross-bars may be conveniently secured in the tire-strip in the desired position either before or after vulcanizing the strip, as preferred.

The invention consists in the matters hereinafter described, and more fully pointed out and defined in the appended claims.

In the drawings, Figure 1 is a side elevation of a channel having a tire-strip therein embodying my invention, showing the same broken obliquely. Fig. 2 is a transverse section of the same, showing the tire-strip in position before the application of the peripheral binding-wires. Fig. 3 is a similar view showing the side binding-wires in place. Fig. 4 is a section similar to Fig. 2 and illustrating a modified form of the transverse bars or wires. Fig. 5 is a similar view showing the binding-wires in place. Fig. 6 is an enlarged fragmentary detail of a part of the channel, tire-strip, and transverse wire or bar. Fig. 7 is a perspective view of one form of the transverse binding wire or bars. Fig. 8 is a similar view of another form of the same. Fig. 9 is a section taken on the line 9 9 of Fig. 1.

As shown in said drawings, A indicates a channel adapted to be secured upon the periphery of the wheel to which the tire is to be attached and provided with divergent side flanges $a$ in the usual manner and in which is secured a tire-strip, of rubber or other suitable material, having a tread portion B and a base portion $b$. Said tire-strip is provided on each side with a longitudinal shoulder $b'$, which lies approximately at the height of the side flanges $a$ and is adapted to form a seat for the side binding-wires E, which engage thereon between the tread of the tire and each of said flanges. Extending transversely through the tire-base at a point slightly below said shoulders and the side binding-wires E and separated therefrom by a portion of the tire material are transverse retaining-bars C, which, as shown, are arranged at short intervals apart and each of which is provided at one end with a downwardly-extending foot $c$, having an extended under surface and which is embedded and extends to near the bottom of the tire-base. The broad downwardly-extending ends or feet of said cross wires or bars C are arranged alternately on opposite sides of the channel, and a plurality of layers $d$ of canvas or other suitable reinforcing material are arranged beneath the same, covering the bottom of the tire-base, and an outer investing layer D of the same or any suitable material incloses the same and extends upwardly on each side of the tire to the shoulder $b'$, concealing the ends of said cross bars or wires. This investing layer D is usually a strong fabric, such as canvas or other suitable material, which is vulcanized thereon, together with said layers $d$, at the base of the tire and acts to increase the stiffness of the tire-base, while binding the same to the tire-strip as a unitary structure. Said cross bars or wires C may be flattened to afford a relatively broad bearing-surface within the tire, and the downwardly-extended ends or feet may be of any desired form and, as shown, though resting on a thin layer of the rubber, extend to near the uppermost of said layers $d$ of fabric at the base of the tire. Compression upon the shoulder $b'$ above the cross-bars forces said ends inwardly, compressing said thin layer of rubber beneath the feet $c$ until said feet are afforded a positive support on the canvas layers $d$, balancing said pressure. Said cross bars or wires, as shown in Figs. 4, 5, 6, and 7, are constructed to afford a double hold in the tire-base and for this purpose are formed, by stamping or other suitable manner, of a rod or bar of metal C', bent at one end to afford a downturned foot or projection $c'$, the lower end $c^2$ of which is turned inwardly toward the center of the tire-base and close above the layer $d$, of canvas or other stiffening material, of the tire-base.

The operation is as follows: The tire constructed as described and with the transverse rods or bars C or C' bedded therein slightly below said shoulders and with the downturned ends thereof alternately disposed at the sides of the tire and covered by the investing fabric D and, if preferred, by a small portion of the tire material between the ends of the same and said fabric fits in the channel, with the shoulders $b'$ at or near the tops of said flanges $a$. When the side binding-wires E are secured in place, the shoulders of rubber, $b'$, above the sides of the transverse wires or bars are uniformly compressed, and the transverse bars or rods C or C' are borne downwardly, thereby compressing the thin layer of rubber beneath the downturned ends $c$ $c'$ $c^2$ thereof and affording a comparatively positive bearing on the reinforcing layers $d$ and D and the bottom of the channel. As said downturned ends or feet are arranged alternately on opposite sides of the strip, it is obvious that each of said binding-wires is afforded a support thereby which is communicated directly to the bottom of the channel.

In the construction illustrated in Figs. 4 to 7, inclusive, the ends $c^2$ of the bar or wire extend inwardly closely to and above said reinforcing fabric or material, thus affording a double bond or hold in the tire-base, and inasmuch as the ends $c^2$ lie in close proximity with the lining fabric $d$ the resistance against tearing is more than doubled. Furthermore, said inwardly-turned ends $c^2$ act as a leaf-spring, greatly increasing the resiliency of the transverse bars and acting to support the straight end of said bars yieldingly against the pressure of the side binding-wires.

The cross bars or wires C and C' may be secured in place before vulcanizing the tire or, if preferred, may be secured in after the tire-strip has been wholly or in part vulcanized and before the canvas reinforcements D and $d$ are secured thereon by vulcanizing or other suitable means. Obviously, too, said inturned ends may, if preferred, be of any desired length sufficient to afford a bearing for the downturned ends $c'$ and sufficiently broad to avoid cutting or perforating the reinforcing-base $d$ and investing fabric D.

While I have described my construction as embracing a tire-strip adapted to be secured within a channel by means of side retaining or binding wires, a central binding-wire E' may be used either with or without the side binding-wires. When secured in the channel by a center wire, said feet act to communicate the pressure directly to the bottom of the channel, while said spring ends $c^2$ act as springs to prevent the ends of the cross-wires bending upwardly.

Obviously many details of construction and application may be varied without departing from the principle of my invention.

I claim as my invention—

1. As an article of manufacture, a rubber tire-strip, transverse rods, a downturned foot thereon extending to near the bottom of the tire-strip and provided with a broad bearing-surface and a shoulder of tire material above and below each end of said rod and affording a cushion for the retaining means.

2. In a resilient tire, the combination with a tire-strip, of laterally-disposed continuous shoulders thereon, transverse rods extending through said tire below said shoulders, a downturned end or foot on one end of each of said rods embedded within the tire-base and affording a broad bearing therein and a plurality of layers of fabric beneath said feet and separated therefrom by a thin strip of tire material.

3. In a resilient tire-strip, closely-arranged transverse rods in the base thereof, a relatively broad downwardly-extending foot on alternate ends of said rods, a reinforcing-base of fabric or the like permanently secured to the bottom and sides of said strip and upon which said feet have a broad bearing.

4. In a vehicle-tire, the combination with a tire-strip comprising a tread portion and a base portion of a longitudinal shoulder on each side the tire-strip at the top of the base, bars or wires arranged transversely of the tire-base below said shoulders and extending to near the sides of the tire-base, a reinforcing fabric or the like permanently secured to the tire-strip and a downturned foot on each cross-bar extending into proximity with the reinforcing-base and a resilient extension thereon.

5. The combination with the channeled wheel-rim having diverging side flanges of a tire-strip in said channel, longitudinal shoulders on the tire-strip at approximately the height of the flanges, cross-bars embedded in said tire-strip below the shoulders, a downwardly and inwardly turned resilient end on each of said cross-bars embedded in said tire-strip adjacent the reinforcing-base and side retaining wires or bands engaged on said shoulders.

6. In a tire-strip, a cross wire or bar comprising a rod shaped at one end to afford a downturned foot adapted to lie approximately parallel with the side of the tire-base and an inwardly-directed extension at the extremity of said foot adapted to engage in the tire-strip adjacent the bottom thereof and acting to stiffen the center of the same against upward movement.

7. As an article of manufacture, a tire-strip having embedded therein from opposite sides thereof, cross wires or rods provided on opposite sides the tire-strip with a hooked inwardly-extending end lying near the bottom of the tire-strip and affording a reinforcement against upward bending at the longitudinal center of the tire and a shoulder of rubber or the like above said cross-wires on each side of the tire.

8. In a tire-strip, oppositely-disposed shoulders extending longitudinally thereof, cross-wires in said tire-base positioned below said shoulders, a foot on alternate ends of said wires having a broad lower bearing-face and extending into proximity with the bottom of the tire-strip, a reinforcing-base on each strip, an investing material inclosing the bottom of the tire and extending upwardly to said shoulders, binding-wires engaging on said shoulders and acting by inward pressure, to compress the ends of the rubber above the ends of the cross-wires and below the feet thereof.

9. As an article of manufacture, a rubber tire-strip, comprising a tread portion and a base portion, longitudinal shoulders on each side the tire-strip at the junction of the base and the tread, a reinforcing-base comprising a plurality of layers of fabric vulcanized to the bottom of the tire-base, an investing fabric inclosing the same and extending upwardly to said shoulders, cross-wires permanently secured below the shoulders and comprising rods having one downturned end parallel with the side of the tire-base and an inwardly-directed extension thereof lying in proximity with said reinforcement and affording a positive but resilient support for the retaining means whereby said tire-strip is adapted to be secured in the channel or the like.

10. The combination with a channeled wheel-rim of a tire-strip fitting therein, cross-wires secured in the tire-strip, a spring end on each lying beneath the same in the bottom of the tire-strip and one or more longitudinal binding-wires engaging the strip above the cross-wires and holding the same in the channel.

11. The combination with a channeled wheel-rim of a tire-strip fitting therein, cross-wires secured in the tire-strip, a downwardly and inwardly turned spring end on each and a central longitudinal binding-wire engaging the strip above the cross-wires and holding the same in the channel.

12. The combination with the channeled wheel-rim having diverging side flanges of a tire-strip in said channel, longitudinal shoulders on the tire-strip at approximately the height of the flanges, cross-bars embedded in said tire-strip below the shoulders, a downwardly and inwardly turned resilient end on each of said cross-bars embedded in said tire-strip adjacent the reinforcing-base, a central longitudinal binding-wire engaging in the strip above the cross-bars and side retaining wires or bands engaged on said shoulders.

In testimony whereof I have hereunto subscribed my name in the presence of two subscribing witnesses.

GEORGE B. DRYDEN.

Witnesses:
C. W. HILLS,
J. J. McFARLAND.